United States Patent
Miyamoto et al.

(10) Patent No.: US 7,060,780 B2
(45) Date of Patent: Jun. 13, 2006

(54) MOLDINGS OF FLAME-RETARDANT AROMATIC POLYCARBONATE RESIN COMPOSITIONS

(75) Inventors: Akira Miyamoto, Yokohama (JP); Toshiharu Sakuma, Kawasaki (JP); Kazuhiro Shibuya, Yokohama (JP); Hiroshi Hachiya, Kurashiki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/507,903

(22) PCT Filed: Mar. 18, 2003

(86) PCT No.: PCT/JP03/03283
§ 371 (c)(1),
(2), (4) Date: Sep. 16, 2004

(87) PCT Pub. No.: WO03/078130
PCT Pub. Date: Sep. 25, 2003

(65) Prior Publication Data
US 2005/0159518 A1    Jul. 21, 2005

(30) Foreign Application Priority Data
Mar. 18, 2002 (JP) ............... 2002-074162

(51) Int. Cl.
*C08G 64/00* (2006.01)

(52) U.S. Cl. ............... 528/196; 264/176.1; 264/219; 524/101; 524/104; 524/106; 524/183; 524/404; 528/198

(58) Field of Classification Search ............ 264/176.1, 264/219; 524/101, 104, 106, 183, 404; 528/196, 528/198
See application file for complete search history.

(56) References Cited

U.S. PATENT DOCUMENTS

| | | | | |
|---|---|---|---|---|
| 4,391,935 A | * | 7/1983 | Bialous et al. | 524/82 |
| 5,182,325 A | * | 1/1993 | Claesen et al. | 524/404 |
| 6,790,887 B1 | * | 9/2004 | Nishihara | 524/120 |

FOREIGN PATENT DOCUMENTS

| | | |
|---|---|---|
| EP | 979840 A2 | 2/2000 |
| GB | 1516544 A | 7/1978 |
| JP | 6-306267 A | 11/1994 |
| JP | 11-263902 A | 9/1999 |
| JP | 2001-164105 A | 6/2001 |
| JP | 2001-232658 A | 8/2001 |
| JP | 2002-080710 A | 3/2002 |
| JP | 2003-049076 A | 2/2003 |
| WO | WO 00/50511 A1 | 8/2000 |
| WO | WO-01/44351 A1 | 6/2001 |

* cited by examiner

*Primary Examiner*—Terressa Boykin
(74) *Attorney, Agent, or Firm*—Birch, Stewart, Kolasch & Birch, LLP

(57) ABSTRACT

A molded article produced by injection-molding a molten form of a flame-retardant aromatic polycarbonate resin composition comprising: 100 parts by weight of an aromatic polycarbonate (A) (Mw: 17,000 to 35,000), 0.01 to 3 parts by weight of inorganic compound particles (B) (average diameter: 10 nm to 10 μm), 0.001 to 0.5 part by weight of an alkali metal salt (C) of an organic sulfonic acid, and 0.01 to 0.5 part by weight of a fluoropolymer (D), wherein the largest FL/t ratio of the molded article is 50 or more, wherein FL is a flow length of the composition in a mold and t is a thickness of the molded article, the FL/t ratios being obtained by measuring the thicknesses of the molded article at portions corresponding to flow paths (L) (from a gate to points at which the flow of the composition stops) of the composition in the mold during the molding, and calculating an integral of (dL/T') along each (L) (dL: length of a segment of (L), t': thickness of the molded article at a portion corresponding to the segment), wherein the calculated integrals are defined as the FL/t ratios.

13 Claims, No Drawings

MOLDINGS OF FLAME-RETARDANT AROMATIC POLYCARBONATE RESIN COMPOSITIONS

BACKGROUND OF THE INVENTION

1. Field of the Invention

The present invention relates to a molded article of a flame-retardant aromatic polycarbonate resin composition. More particularly, the present invention is concerned with a molded article of a flame-retardant aromatic polycarbonate resin composition, which is produced by injection-molding a flame-retardant aromatic polycarbonate resin composition comprising, in a specific ratio, an aromatic polycarbonate (A) having a weight average molecular weight of from 17,000 to 35,000, inorganic compound particles (B) having an average particle diameter of from 10 nm to 10 μm, an alkali metal salt (C) of an organic sulfonic acid, and a fluoropolymer (D). The molded article of the present invention has a feature that the largest value of FL/t ratios of the molded article is 50 or more, wherein FL represents a flow length of the resin composition in a mold used for the injection-molding and t represents a thickness of the molded article. This feature means that the molded article has a small thickness. The thin molded article of the present invention has an excellent flame retardancy and an excellent heat resistance. Further, the present invention is also concerned with a method for producing the above-mentioned molded article of a flame-retardant aromatic polycarbonate resin composition.

2. Prior Art

A flame retardant aromatic polycarbonate resin composition has been widely used as materials for housings or parts of various devices, such as computers (e.g., a notebook computer), copying machines, facsimile machines, printers, projectors, portable devices, electric and electronic appliances, and high precision machines. Many of such housings and parts are produced by injection molding.

However, generally, the melt fluidity of an aromatic polycarbonate is poor. Such poor melt fluidity of an aromatic polycarbonate is disadvantageous especially when the aromatic polycarbonate is used for producing a thin molded article for the purpose of reducing the weight of an ultimate product in which a molded article is used.

As a method for producing a thin molded article from a resin having a poor fluidity, there is known a method in which the number of resin-injection gates of a mold is increased. However, this method has problems in that the structure of the mold becomes complicated, that the produced molded article has a large number of weld lines and gate marks, so that the appearance of the molded article is spoiled, and that the strength of the molded article is lowered. Therefore, in the production of a thin resin molded article by injection molding, it is preferred that the number of gates of the mold used is as small as possible. In other words, it has been strongly desired to develop a method which is suitable for the production of a thin resin molded article which has a large FL/t ratio, wherein FL represents a flow length of the resin in a mold used in the production of the molded article and t represents a thickness of the molded article.

As a method for improving the melt fluidity of an aromatic polycarbonate, there is known a method in which the injection molding of an aromatic polycarbonate is performed under conditions wherein the temperature of the aromatic polycarbonate in the molding machine used is high. However, flame retardants used in conventional aromatic polycarbonate resin compositions have unsatisfactory heat stability. Therefore, when the resin temperature during the injection molding is high, the heat decomposition of the flame retardant proceeds, and the resultant heat decomposition products in turn promote the decomposition of the aromatic polycarbonate, thereby causing disadvantages, such as marked lowering of properties of the aromatic polycarbonate resin composition, and generation of a large amount of decomposition gas during the molding, which spoils the working environment.

In many of the conventional flame retardant aromatic polycarbonate resin compositions, a bromine-containing flame retardant or a phosphorus-containing flame retardant is used. However, such a bromine-containing flame retardant and a phosphorus-containing flame retardant have low heat stability. Therefore, with respect to the conventional flame retardant polycarbonate resin compositions containing a bromine-containing flame retardant or a phosphorus-containing flame retardant, it is generally difficult to perform an injection molding thereof at high resin temperatures exceeding 300° C. because of not only a difficulty in maintaining the quality of a molded article at a satisfactory level, but also difficulties relating to operations involved or an apparatus needed.

Therefore, the injection molding of a flame retardant polycarbonate resin composition needs to be performed at moderate resin temperatures within the range wherein the decomposition of the flame retardant does not easily proceed. As a specific method for performing the injection molding at such moderate resin temperatures, there is a method in which an aromatic polycarbonate is blended with another resin, such as an acrylonitrile/butadiene/styrene copolymer (ABS resin), to thereby improve the balance between the melt fluidity and flame retardancy of an aromatic polycarbonate resin composition. This method has already been put to practical use.

However, the method in which an aromatic polycarbonate is blended with another resin has a problem in that excellent properties (such as heat resistance and impact resistance) inherently possessed by an aromatic polycarbonate are spoiled.

On the other hand, as a method for improving the flame retardancy of an aromatic polycarbonate without using a bromine-containing flame retardant or a phosphorus-containing flame retardant, Examined Japanese Patent Publication No. Sho 60-38418 (corresponding to U.S. Pat. No. 4,391,935) discloses a method in which an alkali metal salt or alkaline earth metal salt of an organic acid and polytetrafluoroethylene are blended with an aromatic polycarbonate.

However, when a thin molded article is produced from a resin composition obtained by the method of the above-mentioned patent document, a problem arises in that the flame retardancy of the obtained molded article is unsatisfactory. Further, when it is attempted to improve the melt fluidity of the resin composition by performing an injection molding at high resin temperatures so as to obtain a thin molded article, a problem arises in that the melt stability of the resin composition is unsatisfactory.

WO00/50511 discloses a method in which an organic sulfonic acid salt and microparticles of a sulfuric acid salt and/or a metal oxide are blended with an aromatic polycarbonate.

However, the resin compositions obtained in the working examples of WO00/50511 do not have a melt fluidity sufficient to obtain a thin molded article. In addition, for obtaining a thin molded article having high flame retardancy from the resin composition of WO00/50511, it is necessary to increase the amounts of a sulfuric acid salt and an organic sulfonic acid salt. Therefore, the melt stability of the resin composition (i.e., the heat stability of the resin composition during the residence thereof in a molten form in a molding machine) becomes unsatisfactory. Thus, it is difficult to improve simultaneously the flame retardancy and melt stability of the resin composition of WO00/50511.

As can be seen from the above, the conventional flame retardant aromatic polycarbonate resin composition containing a bromine-containing flame retardant or a phosphorus-containing flame retardant cannot be used to produce a thin molded article having a satisfactory heat resistance as well as a satisfactory flame retardancy. Further, the conventional flame retardant aromatic polycarbonate resin composition which contains a flame retardant other than a bromine-containing flame retardant and a phosphorus-containing flame retardant also has a problem in that the heat stability of the flame retardant used is unsatisfactory, or in that it is difficult to secure a satisfactory melt stability of the resin composition while maintaining high melt fluidity of the resin composition since, for example, the use of a large amount of a flame retardant is needed to obtain a thin molded article having high flame retardancy.

Thus, it has been strongly desired to develop a thin molded article of a flame retardant aromatic polycarbonate resin composition (i.e., a molded article having a large FL/t ratio, wherein FL represents a flow length of the flame retardant aromatic polycarbonate resin composition in a mold used in the production of the molded article and t represents a thickness of the molded article) which has an excellent heat resistance as well as an excellent flame retardancy. However, heretofore, such an excellent thin molded article has not been obtained.

SUMMARY OF THE INVENTION

In this situation, the present inventors have made extensive and intensive studies with a view toward developing a method for producing a thin molded article of a flame retardant aromatic polycarbonate resin composition (i.e., a molded article having a large FL/t ratio, wherein FL represents a flow length of the flame retardant aromatic polycarbonate resin composition in a mold used in the production of the molded article and t represents a thickness of the molded article) which has an excellent heat resistance as well as an excellent flame retardancy. As a result, it has surprisingly been found that a thin molded article which, despite its small thickness, exhibits an excellent heat resistance as well as an excellent flame retardancy can be obtained by injection-molding, under specific conditions, a flame-retardant aromatic polycarbonate resin composition comprising, in a specific ratio, an aromatic polycarbonate (A) having a weight average molecular weight of from 17,000 to 35,000, inorganic compound particles (B) having an average particle diameter of from 10 nm to 10 μm, an alkali metal salt (C) of an organic sulfonic acid, and a fluoropolymer (D). The present invention has been completed, based on this novel finding.

Accordingly, it is an object of the present invention to provide a thin molded article of a flame retardant aromatic polycarbonate resin composition, which, despite its small thickness, exhibits an excellent heat resistance as well as excellent flame retardancy.

It is another object of the present invention to provide a method for efficiently producing the above-mentioned excellent molded article.

The foregoing and other objects, features and advantages of the present invention will be apparent from the following detailed description and claims.

DETAILED DESCRIPTION OF THE INVENTION

For easy understanding of the present invention, the essential features and various preferred embodiments of the present invention are enumerated below.

1. A molded article of a flame-retardant aromatic polycarbonate resin composition, which is produced by injection-molding a molten form of a flame-retardant aromatic polycarbonate resin composition in a mold having at least one gate for introduction of the resin composition, the flame-retardant aromatic polycarbonate resin composition comprising:

100 parts by weight of an aromatic polycarbonate (A) having a weight average molecular weight of from 17,000 to 35,000, 0.01 to 3 parts by weight of inorganic compound particles (B) having an average particle diameter of from 10 nm to 10 μm, 0.001 to 0.5 part by weight of an alkali metal salt (C) of an organic sulfonic acid, and 0.01 to 0.5 part by weight of a fluoropolymer (D)

wherein the largest value of FL/t ratios of the molded article is 50 or more, wherein FL represents a flow length of the resin composition in the mold and t represents a thickness of the molded article, the FL/t ratios being obtained by a method comprising:

measuring the thicknesses of the molded article at portions thereof which, respectively, correspond to flow paths (L) of the molten form of the resin composition in the mold during the injection molding, the flow paths (L) extending from the gate of the mold to points in the mold at which the flow of the molten form of the resin composition stops, and calculating an integral of (dL/T') along each of the flow paths (L), wherein dL represents the length of a segment of flow path (L) and t' represents the thickness of the molded article at a portion thereof which corresponds to the segment, wherein the integrals respectively calculated with respect to the flow paths (L) are defined as the FL/t ratios of the molded article.

2. The molded article according to item 1 above, which has at least one thin portion having a thickness of 2.0 mm or less, wherein the ratio of the at least one thin portion is 50% by weight or more, based on the weight of the molded article.

3. The molded article according to item 1 or 2 above, wherein the inorganic compound particles (B) are metal oxide particles.

4. The molded article according to item 3 above, wherein the metal oxide particles are silicon oxide particles produced by the dry method.

5. The molded article according to any one of items 1 to 4 above, wherein the surfaces of the inorganic compound particles (B) are modified with a silicon compound.

6. The molded article according to any one of items 1 to 5 above, wherein when the alkali metal salt (C) of an organic sulfonic acid is subjected to thermogravimetric analysis at a temperature elevation rate of 10° C./min in a nitrogen atmosphere, the temperature at which the weight reduction of the alkali metal salt (C) reaches 5% by weight is 400° C. or higher.

7. The molded article according to any one of items 1 to 6 above, which has at least one functional portion selected from the group consisting of a boss, a rib, a pin and a corner.

8. A method for producing a molded article, which comprises:
   (1) charging a molten form of a flame-retardant aromatic polycarbonate resin composition into a mold by using an injection-molding machine, the flame-retardant aromatic polycarbonate resin composition comprising:
      100 parts by weight of an aromatic polycarbonate (A) having a weight average molecular weight of from 17,000 to 35,000,
      0.01 to 3 parts by weight of inorganic compound particles (B) having an average particle diameter of from 10 nm to 10 μm,
      0.001 to 0.5 part by weight of an alkali metal salt (C) of an organic sulfonic acid, and
      0.01 to 0.5 part by weight of a fluoropolymer (D),
      wherein the temperature ($T_M$: °C.) of the molten form of the resin composition charged into the mold satisfies the following formula (1):

$$0.005Mw + 175 \leq T_M \leq 350 \tag{1}$$

wherein Mw represents the weight average molecular weight of the aromatic polycarbonate (A),
   (2) cooling the resin composition in the mold to thereby form a molded article in the mold, and
   (3) recovering the molded article from the mold.

9. The method according to item 8 above, wherein the inorganic compound particles (B) are metal oxide particles.

10. The method according to item 9 above, wherein the metal oxide particles are silicon oxide particles produced by the dry method.

11. The method according to any one of items 8 to 10 above, wherein the surfaces of the inorganic compound particles (B) are modified with a silicon compound.

12. The method according to any one of items 8 to 11 above, wherein when the alkali metal salt (C) of an organic sulfonic acid is subjected to thermogravimetric analysis at a temperature elevation rate of 10° C./min in a nitrogen atmosphere, the temperature at which the weight reduction of the alkali metal salt (C) reaches 5% by weight is 400° C. or higher.

13. The method according to any one of items 8 to 12 above, wherein the molded article has at least one functional portion selected from the group consisting of a boss, a rib, a pin and a corner.

Hereinbelow, the present invention is described in detail.

First, an explanation is given below with respect to component (A).

As component (A), it is preferred to use an aromatic polycarbonate which is obtained from an aromatic dihydroxy compound. Specific examples of aromatic dihydroxy compounds include bis(hydroxyaryl)alkanes, such as 1,1-bis(4-hydroxy-t-butylphenyl)propane and 2,2-bis(4-hydroxyphenyl)propane; bis(hydroxyaryl)-cycloalkanes, such as 1,1-bis(4-hydroxyphenyl)-cyclopentane and 1,1-bis(4-hydroxyphenyl)cyclohexane; dihydroxyaryl ethers, such as 4,4'-dihydroxydiphenyl ether and 4,4'-dihydroxy-3,3'-dimethylphenyl ether; dihydroxyaryl sulfides, such as 4,4'-dihydroxydiphenyl sulfide and 4,4'-dihydroxy-3,3'-dimethylphenyl sulfide; dihydroxyaryl sulfoxides, such as 4,4'-dihydroxydiphenyl sulfoxide and 4,4'-dihydroxy-3,3'-dimethylphenyl sulfoxide; and dihydroxyaryl sulfones, such as 4,4'-dihydroxydiphenyl sulfone and 4,4'-dihydroxy-3,3'-dimethylphenyl sulfone.

Among these aromatic dihydroxy compounds, those which are derived from 2,2-bis(4-hydroxyphenyl)propane (the so-called "bisphenol A") are most preferred. These aromatic dihydroxy compounds can be used individually or in combination.

In the present invention, aromatic polycarbonates which are preferably used as component (A) can be produced by any conventional methods. Examples of conventional methods include an interfacial polymerization process (e.g., phosgene process) in which an aromatic dihydroxy compound and a carbonate precursor (e.g., phosgene) are reacted with each other in the presence of an aqueous sodium hydroxide solution and methylene chloride as a solvent; a transesterification process (melt process) in which an aromatic dihydroxy compound and a carbonic diester (e.g., diphenyl carbonate) are reacted with each other; a solid-phase polymerization process in which a carbonate prepolymer obtained by the phosgene process or by the melt process is crystallized and subjected to a solid-phase polymerization (see Unexamined Japanese Patent Application Laid-Open Specification No. Hei 1-158033 (corresponding to U.S. Pat. No. 4,948,871), Unexamined Japanese Patent Application Laid-Open Specification No. Hei 1-271426, and Unexamined Japanese Patent Application Laid-Open Specification No. Hei 3-68627 (corresponding to U.S. Pat. No. 5,204,377)).

As an aromatic polycarbonate which is especially preferred as component (A), there can be mentioned an aromatic polycarbonate produced from a dihydric phenol (an aromatic dihydroxy compound) and a carbonic diester by a transesterification process. Such an aromatic polycarbonate resin contains substantially no chlorine atoms.

The weight average molecular weight (Mw) of the aromatic polycarbonate used as component (A) in the present invention is generally from 17,000 to 35,000, preferably from 18,000 to 30,000, more preferably from 19,000 to 28,000, still more preferably from 20,000 to 25,000, most preferably from 21,000 to 23,000. When the Mw of the aromatic polycarbonate is less than 17,000, the strength or impact resistance of the molded article becomes unsatisfactory. On the other hand, when the Mw of the aromatic polycarbonate exceeds 35,000, the melt fluidity of the aromatic polycarbonate resin composition used in the present invention becomes insufficient to obtain a thin molded article.

In the present invention, the weight average molecular weight (Mw) of the aromatic polycarbonate can be measured by gel permeation chromatography (GPC) as follows. A calibration curve is obtained with respect to standard monodispersed polystyrene samples using a polystyrene gel column and tetrahydrofuran as a solvent. The obtained calibration curve is modified by a calculation using the following formula:

$$M_{PC} = 0.3591 M_{PS}^{1.0388}$$

wherein $M_{PC}$ represents the molecular weight of the aromatic polycarbonate and $M_{PS}$ represents the molecular weight of the polystyrene, thereby obtaining a modified calibration curve for the aromatic polycarbonate. The weight average molecular weight of the aromatic polycarbonate is measured by GPC using the obtained modified calibration curve.

Further, in the present invention, as component (A), two or more types of aromatic polycarbonates having different molecular weights can be used in combination. For example, an aromatic polycarbonate usable as a raw material for producing an optical disk, which in general has a weight average molecular weight (Mw) of from 14,000 to 16,000, can be used in combination with an aromatic polycarbonate usable as a raw material for producing an injection-molded article or an extrusion-molded article, which in general has a weight average molecular weight (Mw) of from 20,000 to 50,000.

Next, an explanation is given below with respect to component (B) used in the present invention.

As component (B), it is preferred to use particles of at least one inorganic compound selected from the group consisting of a carbonic acid salt, a sulfuric acid salt, a chromic acid salt, a titanic acid salt, a silicic acid salt, a metal nitride, a metal carbide, a metal sulfide and a metal oxide, wherein the particles have an average particle diameter of from 10 nm to 10 μm.

Specific examples of carbonic acid salts include calcium carbonate, sodium carbonate, magnesium carbonate, strontium carbonate, barium carbonate, zinc carbonate and hydrotalcite.

Specific examples of sulfuric acid salts include calcium sulfate, magnesium sulfate, barium sulfate and copper sulfate.

Specific examples of chromic acid salts include lead chromate, zinc chromate and barium chromate.

Specific examples of titanic acid salts include potassium titanate, sodium titanate, barium titanate, calcium titanate, strontium titanate and magnesium titanate.

Specific examples of silicic acid salts include wollastonite, xonotlite, talc, clay, mica, montmorillonite, saponite, bentonite, sepiolite and kaolin.

Specific examples of metal nitrides include titanium nitride, silicon nitride and boron nitride.

Specific examples of metal carbides include silicon carbide, tungsten carbide and titanium carbide.

Specific examples of metal sulfides include zinc sulfide, titanium sulfide, iron sulfide, lead sulfide and tungsten sulfide.

Specific examples of metal oxides include silicon oxide, titanium oxide, aluminum oxide, zinc oxide, cerium oxide, yttrium oxide, zirconium oxide, tin oxide, iron oxide, magnesium oxide, manganese oxide and holmium oxide.

In the present invention, the "particles" mean those which are observed as distinct particles in the transmission electron microscopy (TEM) performed with respect to an ultrathin specimen of a resin composition, or in the scanning probe microscopy (SPM) performed with respect to a surface or cross-section of a molded article of the resin composition (maginification in each of the microscopies is generally from ×10,000 to ×100,000). The inorganic compound particles (B) may comprise either or both of independent primary particles and aggregates and/or agglomerates of primary particles. In the present invention, the meanings of each of the "aggregates" and the "agglomerates" are as defined in DIN53206.

In the present invention, the particle diameters of the inorganic compound particles can be measured by an observation under a transmission electron microscope (TEM) or a scanning probe microscope (SPM). Specifically, a photomicrograph of a resin composition is taken using either of the above-mentioned microscopes, and the areas of 100 or more inorganic compound particles on the photomicrograph are measured. From the measured areas of the magnified particles, the actual areas (S) of the particles are obtained by dividing the measured areas of the magnified particles by the magnification of the microscope. From the thus obtained actual areas S, the particle diameters of the inorganic compound particles are calculated by the formula $(4S/\pi)^{0.5}$.

Further, in the present invention, the "average particle diameter" of component (B) means the number average particle diameter of component (B).

The average particle diameter of inorganic compound particles usable as component (B) is in the range of from 10 nm to 10 μm, preferably from 30 nm to 5 μm, more preferably from 40 nm to 1 μm, still more preferably from 50 to 500 nm, still more preferably from 60 to 300 nm, most preferably from 70 to 200 nm. When the average particle diameter is less than 10 nm, the melt stability of the resin composition (i.e., the heat stability of the resin composition during the residence thereof in a molten form in a molding machine) becomes unsatisfactory. On the other hand, when the average particle diameter is more than 10 μm, the flame retardancy of the thin molded article becomes unsatisfactory.

Component (B) may be in any of various forms, such as a particle, a sphere, a needle, a plate, a rod or a chain (including branched chain), and is preferably in the form of a needle, a plate or a chain, and is more preferably in the form of a chain. Component (B) may be present in the resin composition in the form of either or both of independent primary particles and aggregates and/or agglomerates of primary particles.

In the present invention, it is preferred that component (B) has a specific surface area (which is measured by the BET method, namely the method based on the BET adsorption isotherm) of from 50 to 400 $m^2/g$, more advantageously from 60 to 350 $m^2/g$, still more advantageously from 100 to 300 $m^2/g$.

In the present invention, as component (B), it is most preferred to use metal oxide particles.

Among metal oxide particles usable as component (B), it is especially preferred to use aggregates and/or agglomerates of metal oxide primary particles, in which the metal oxide primary particles are bonded together to form chains.

Specific examples of the above-mentioned especially preferred metal oxide particles include aggregates and/or agglomerates of silicon oxide primary particles, aggregates and/or agglomerates of titanium oxide primary particles, and aggregates and/or agglomerates of aluminum oxide primary particles, each of which is in the form of a chain formed by the primary particles. Of these, it is preferred to use aggregates and/or agglomerates of silicon oxide primary particles. Further, among aggregates and/or agglomerates of silicon oxide primary particles, it is especially preferred to use those which are obtained by the so-called "dry method" in which silicon oxide is synthesized by hydrolyzing a silicon halide at a high temperature in an oxyhydrogen flame. The silicon oxide produced by the above-mentioned dry method is generally called "fumed silica".

More specifically, a fumed silica can be produced, for example, by a method disclosed in Unexamined Japanese Patent Application Laid-Open Specification No. 2000-86227. Specific examples of methods for producing a fumed silica include a method in which a volatile silicon compound as a raw material is fed to a burner together with a gaseous mixture containing a flammable gas and oxygen gas, to thereby cause a thermal decomposition of the volatile silicon compound at a temperature of from 1,000 to 2,100° C., thereby obtaining a fumed silica. Examples of volatile silicon compounds as a raw material include $SiH_4$, $SiCl_4$, $CH_3SiCl_3$, $CH_3SiHCl_2$, $HSiCl_3$, $(CH_3)_2SiCl_2$, $(CH_3)_3SiCl$, $(CH_3)_2SiH_2$, $(CH_3)_3SiH$ and alkoxysilanes. Of these, preferred are halogenated silicon compounds, such as $SiCl_4$, $CH_3SiCl_3$, $CH_3SiHCl_2$, $HSiCl_3$, $(CH_3)_2SiCl_2$ and $(CH_3)_3SiCl$. As the above-mentioned gaseous mixture containing a flammable gas and oxygen gas, it is preferred to use a gaseous mixture which generates water. As a suitable example of such a gaseous mixture, there can be mentioned a mixture of a flammable gas, such as hydrogen gas, methane or butane, and an oxygen-containing gas, such as oxygen gas or air.

It is preferred that the ratio between the volatile silicon compound and the gaseous mixture containing oxygen gas and a flammable gas (e.g., hydrogen gas) is adjusted so that the oxygen gas and the hydrogen gas are used in molar amounts which are, respectively, 2.5 to 3.5 times and 1.5 to 3.5 times the molar equivalents of the oxygen gas and the hydrogen gas, each relative to the volatile silicon compound. The term "molar equivalents of the oxygen gas and the hydrogen gas" means the stoichiometric equivalents of the oxygen gas and the hydrogen gas, which react with the raw material compound (i.e., the volatile silicon compound). When a hydrocarbon fuel, such as methane, is used as a flammable gas, the term "molar equivalent of the hydrogen gas" means the molar equivalent of the hydrocarbon fuel in terms of hydrogen. In this method, primary silica particles having a small average particle diameter can be obtained when the hydrogen gas and the oxygen gas are used in excess amounts, each relative to the amount of the volatile silicon compound, to thereby lower the ratio of the solid (silica) to the gas (oxygen gas and hydrogen gas). Specifically, when the ratio of the solid to the gas is low, the frequency of the collisions among the solid particles can be decreased, to thereby suppress the growth of particles by fusion bonding of particles, so that primary silica particles having a small average particle diameter can be obtained.

With respect to component (B) used in the present invention, it is preferred to modify the surface of component (B) with a silicon compound. The surface modification of component (B) is effective for finely dispersing component (B) in the resin composition by preventing the unfavorable aggregation of component (B) in the resin composition.

As the silicon compound used as a modifier, it is preferred to use at least one silicon compound selected from the group consisting of a chlorosilane, an alkoxysilane, a hydrosilane, a silylamine, a silane coupling agent and a polyorganosiloxane.

The above-mentioned chlorosilane is a silicon compound containing 1 to 4 chlorine atoms in the molecule thereof. Examples of chlorosilanes include a $C_1$–$C_{12}$ alkyltrichlorosilane, methyldichlorosilane, dimethyldichlorosilane, trimethylchlorosilane, phenyltrichlorosilane, diphenylchlorosilane, trifluoropropyltrichlorosilane and heptadecafluorodecyltrichlorosilane. Of these, dimethyldichlorosilane, octyltrichlorosilane and trimethylchlorosilane are preferred.

The above-mentioned alkoxysilane is a silicon compound containing 1 to 4 methoxy groups or ethoxy groups in the molecule thereof. Examples of alkoxysilanes include tetramethoxysilane, a $C_2$–$C_{12}$ alkyltrimethoxysilane, dimethylmethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, hexyltriethoxysilane, trifluoropropyltrimethoxysilane and heptadecatrifluorodecyltrimethoxysilane. Of these, methyltrimethoxysilane, octyltrimethoxysilane, decyltrimethoxysilane and dimethyldimethoxysilane are preferred.

The above-mentioned hydrosilane is a silicon compound containing 1 to 4 Si—H bonds in the molecule thereof. Examples of hydrosilanes include a $C_1$–$C_{12}$ alkylsilane, a di($C_1$–$C_{12}$ alkyl)silane and a tri($C_1$–$C_{12}$ alkyl)silane. Of these, octylsilane is preferred.

The above-mentioned silylamine is a silicon compound containing a silylamine structure represented by the following formula: ≡Si—N=. Examples of silylamines include hexamethyldisilazane, hexaphenyldisilazane, trimethylsilyldimethylamine, trimethylsilyldiethylamine and trimethylsilylimidazole. Of these, hexamethyldisilazane is preferred.

The above-mentioned silane coupling agent is a compound which has a structure represented by the following formula:

$$RSiY_nX_m$$

wherein R represents an organic substituent having a functional group (e.g., a vinyl group, a glycido group, a methacryloyl group, an amino group or a mercapto group) which can be bonded to an organic material, X represents a hydrolyzable group, such as a chlorine atom or an alkoxy group having 1 to 4 carbon atoms, which can be bonded to an inorganic material, Y represents an alkyl group having 1 to 4 carbon atoms, m is an integer of 1 to 3, and n is an integer of 0 to 2, with the proviso that m+n=3, and which has a function to bind an organic material and an inorganic material to each other at an interface therebetween.

Examples of silane coupling agents include vinyltrichlorosilane, vinyltrimethoxysilane, vinyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, N-β(aminoethyl)γ-aminopropylmethyldimethoxysilane, N-β(aminoethyl)γ-aminopropyltrimethoxysilane, N-β(aminoethyl)γ-aminopropyltriethoxysilane, γ-aminopropyltrimethoxysilane, γ-aminopropyltriethoxysilane, N-phenyl-γ-aminopropyltrimethoxysilane, γ-chloropropyltrimethoxysilane and γ-mercaptopropyltrimethoxysilane. Of these, preferred are β-(3,4-epoxycyclohexyl)ethyltrimethoxysilane, γ-glycidoxypropyltrimethoxysilane, γ-glycidoxypropylmethyldiethoxysilane and γ-glycidoxypropyltriethoxysilane.

The above-mentioned polyorganosiloxane is a polymer of a silicon compound, which may be in the form of an oil, a rubber or a resin. As the polyorganosilixane, especially preferred are a silicone oil and a modified silicone oil, which have a viscosity of from 2 to 1,000 cSt (measured at 25° C.).

Examples of silicone oils include a dimethyl silicone oil, a methyl phenyl silicone oil and a methyl hydrogen silicone oil. Of these, a dimethyl silicone oil and a methyl phenyl silicone oil are especially preferred.

Examples of modified silicone oils include a reactive silicone oil having in a molecule thereof at least one reactive substituent selected from the group consisting of an amino group, an epoxy group, a carboxyl group, a hydroxyl group, a methacryloyl group, a mercapto group and a phenol group; and a non-reactive silicone oil having in a molecule thereof at least one non-reactive substituent selected from the group consisting of a polyether group, a methylstyryl group, an alkyl group, a higher fatty acid ester group having 8 to 30 carbon atoms, an alkoxy group having 1 to 30 carbon atoms, a higher fatty acid group having 8 to 30 carbon atoms and a fluorine atom. Of these, preferred are a reactive silicone oil having a hydroxyl group, a reactive silicone oil having an epoxy group and a non-reactive silicone oil having a polyether group.

In the present invention, the treatment for surface modification of component (B) can be performed, for example, by a method described in Unexamined Japanese Patent Application Laid-Open Specification Nos. Hei 9-310027, Hei 9-59533 (corresponding to U.S. Pat. No. 5,843,525) and Hei 6-87609. Specifically, the treatment for surface modification of component (B) can be performed by a method comprising placing metal oxide particles in a vessel equipped with a stirrer, such as a Henschel mixer, and adding the above-mentioned silicon compound as a modifier while stirring, so as to cause the silicon compound as a modifier (preferably in the form of a gas or a mist) to contact with the metal oxide particles, thereby uniformly mixing together the metal oxide particles and the silicon compound as a modifier, while performing a reaction at a high temperature.

When component (B) used is surface-modified with a silicon compound, the amount of the silicon compound as a modifier is preferably from 0.01 to 20% by weight, more preferably from 0.05 to 10% by weight, still more preferably from 1 to 8% by weight, based on the weight of component (B). The amount of the silicon compound as a modifier can be measured by thermogravimetric analysis (TGA). Specifically, component (B) is subjected to TGA, and the weight reduction thereof is measured to determine the amount of the silicon compound as a modifier.

In the present invention, as component (B), it is especially preferred to use a fumed silica which is surface-modified with a silicon compound.

The fumed silica is composed of agglomerates of spherical primary particles of amorphous silica. In the agglomerates, the agglomeration of the primary particles is caused by a hydrogen bond or the van der Waals force, so that the agglomerates are disintegrated to some extent during the melt-kneading thereof with a resin. However, even in the resin composition obtained by the melt-kneading, the above-mentioned agglomerates of primary particles are observed. Further, the particle diameter distribution of the agglomerates present in the resin composition is relatively narrow.

Further, on the surface of the fumed silica particles, 3 to 4 silanol groups are present per $nm^2$ of the surface of the fumed silica particles. The surface modification of the fumed silica particles can be effectively performed by bonding the silicon compound through the silanol groups present on the surface of the fumed silica particles. The fumed silica particles having their surfaces modified with a silicon compound are especially preferred because such fumed silica particles have hydrophobic surfaces so that the fumed silica particles can be easily dispersed in a resin composition and the particle diameter distribution of the fumed silica particles becomes narrow.

Further, the use of the fumed silica particles produced by the dry method is preferred for the following reason. The primary particles of the fumed silica produced by the dry method are not porous, but are dense spherical particles, so that the fumed silica has a low water absorption. Therefore, the fumed silica particles are unlikely to cause any unfavorable phenomena (such as hydrolysis of a resin) in the resin composition, and the use of such fumed silica particles is especially advantageous in that the fumed silica particles are very unlikely to affect adversely the resin composition during the production thereof by the melt-kneading or during the molding of the resin composition.

The porosity of the fumed silica can be evaluated in terms of the "pore volume" measured by a nitrogen adsorption method or a mercury intrusion porosimetry. In the present invention, when an amorphous fumed silica is used as component (B), it is preferred that the amorphous fumed silica has a pore volume of 3 ml/g or less, more advantageously 1 ml/g or less, still more advantageously 0.3 ml/g or less.

In addition, the water content of the amorphous fumed silica is preferably 5% or less, more preferably 3% or less, still more preferably 1% or less, still more preferably 0.5% or less, most preferably 0.3% or less.

Specific examples of component (B) which can be preferably used in the present invention include "Aerosil RY200", "Aerosil RX200", "Aerosil R805", "Aerosil R202", "Aerosil R974" and "Aerosil 200" (each manufactured and sold by Nippon Aerosil Co., Ltd., Japan).

In the present invention, component (B) is used in an amount of from 0.01 to 3 parts by weight, preferably from 0.05 to 2 parts by weight, more preferably from 0.08 to 1 part by weight, still more preferably from 0.1 to 0.5 part by weight, relative to 100 parts by weight of component (A). When component (B) is used in an amount of less than 0.01 part by weight, the flame retardancy of the thin molded article cannot be satisfactorily improved. On the other hand, when component (B) is used in an amount of more than 3 parts by weight, the melt stability of the resin composition during a melt-molding at high resin temperatures becomes unsatisfactory.

Next, an explanation is given below with respect to component (C) used in the resin composition of the present invention.

Component (C) is an alkali metal salt of an organic sulfonic acid. Examples of component (C) include alkali metal salts of aliphatic sulfonic acids and alkali metal salts of aromatic sulfonic acids. These alkali metal salts may be used individually or in combination.

Examples of alkali metals include lithium, sodium, potassium, rubidium and cesium. Of these, lithium, sodium and potassium are preferred, and potassium is most preferred.

Preferred examples of alkali metal salts of aliphatic sulfonic acids include alkali metal salts of $C_1$–$C_8$ alkanesulfonic acids; alkali metal salts of $C_1$–$C_8$ alkanesulfonic acids, wherein each alkyl group thereof is partially fluorinated; and alkali metal salts of $C_1$–$C_8$ perfluoroalkanesulfonic acids. Specific examples of preferred alkali metal salts of aliphatic sulfonic acids include sodium perfluoroethanesulfonate and potassium perfluorobutanesulfonate.

As an alkali metal salt of an aromatic sulfonic acid, it is especially preferred to use an alkali metal salt of a sulfonic acid of an aromatic sulfone. Specific examples of such alkali metal salts include sodium diphenylsulfone-3-sulufonate, potassium diphenylsulfone-3-sulfonate, dipotassium diphenylsulfone-3,3'-disulfonate and dipotassium diphenylsulfone-3,4'-disulfonate.

As component (C), it is especially preferred to use an alkali metal salt of an organic sulfonic acid, which has an excellent heat stability. Specifically, it is preferred that, when the alkali metal salt of an organic sulfonic acid is subjected to thermogravimetric analysis (TGA) at 30° C. at a temperature elevation rate of 10° C./min in a nitrogen atmosphere, the temperature at which the weight reduction of the alkali metal salt reaches 5% by weight is 400° C. or higher.

The above-mentioned alkali metal salt of an organic sulfonic acid, which has an excellent heat stability, can be obtained by removing impurities (e.g., calcium compounds, iron compounds and free halogen atoms) therefrom as much as possible. Specifically, the above-mentioned alkali metal salt of an organic sulfonic acid can be obtained by purifying the raw materials thereof and/or purifying the final product (alkali metal salt), for example, by filtration to remove substances insoluble to an alcohol or by recrystallization.

With respect to component (C) used in the present invention, the Ca content thereof is preferably not more than 50 ppm, more preferably not more than 10 ppm, still more preferably not more than 5 ppm, most preferably not more than 1 ppm.

Further, with respect to component (C), the Fe content thereof is preferably not more than 10 ppm, more preferably not more than 5 ppm, still more preferably not more than 3 pm, most preferably not more than 1 ppm.

Furthermore, with respect to component (C), the halogen atom content thereof is preferably not more than 10 ppm, more preferably not more than 5 ppm, still more preferably not more than 3 pm, most preferably not more than 1 ppm.

In the present invention, as component (C), it is especially preferred to use potassium perfluorobutane sulfonate which has been purified by any of the above-mentioned purification methods. More specifically, as potassium perfluotobutane sulfonate, it is preferred to use perfluotobutane sulfonate wherein when the perfluorobutane sulfonate is subjected to thermogravimetric analysis (TGA) at 30° C. at a temperature elevation rate of 10° C./min in a nitrogen atmosphere, the temperature at which the weight reduction of the perfluorobutane sulfonate reaches 5% by weight is 420° C. or higher, more preferably 440° C. or higher, most preferably 460° C. or higher.

Component (C) promotes the decarboxylation of component (A) (aromatic polycarbonate) during the burning of the aromatic polycarbonate resin composition (used for producing the molded article of the present invention). Thus, component (C) functions as a flame retardant. In the present invention, the combined use of components (B) and (C) has a synergistic effect of suppressing the burning of the resin composition. Therefore, even when component (C) is used in a very small amount, the aromatic polycarbonate resin composition exhibits excellent flame retardancy.

By using components (B) and (C) in combination, the decarboxylation proceeds mildly and uniformly as compared to the case where only component (C) is used as a flame retardant. By an observation under an optical microscope equipped with a heating stage, it can be confirmed that the decarboxylation of component (A) gradually proceeds in accordance with the elevation of temperature and uniformly proceeds throughout the resin composition.

In the aromatic polycarbonate resin composition used in the present invention, by the combined use of components (B) and (C), it becomes possible to obtain excellent flame retardancy by using component (C) in a small amount as compared to the amount of component (C) in the case where only component (C) is used, and, hence, the resin composition exhibits excellent melt stability even at high resin temperatures. Therefore, by using such an aromatic polycarbonate resin composition, not only does it become possible to obtain a thin shaped article which has excellent flame retardancy, but also the excellent heat resistance and impact resistance which an aromatic polycarbonate inherently possesses can be maintained.

In the present invention, component (C) is used in an amount of from 0.001 to 0.5 part by weight, preferably from 0.01 to 0.4 part by weight, more preferably from 0.05 to 0.3 part by weight, most preferably from 0.08 to 0.2 part by weight, relative to 100 parts by weight of component (A).

When component (C) is used in an amount of less than 0.001 part by weight, the flame retardancy of the thin molded article becomes unsatisfactory. On the other hand, when component (C) is used in an amount of more than 0.5 part by weight, the melt stability of the resin composition becomes unsatisfactory, so that it becomes difficult to perform the melt-molding of the resin composition at high temperatures.

Next, an explanation is given below with respect to component (D) used in the present invention.

Component (D) used in the present invention is a fluoropolymer. A "fluoropolymer" means a fluorinated polymer. Examples of fluoropolymers include tetrafluoroethylene polymers, such as polytetrafluoroethylene and a tetrafluoroethylene/propylene copolymer; and perfluoroalkane polymers other than polytetrafluoroethylene. Of these, tetrafluoroethylene polymers are preferred, and polytetrafluoroethylene is most preferred.

In the present invention, it is especially preferred that component (D) is a fluoropolymer having a fibril-forming ability. Further, the fluoropolymer used in the present invention may be in any of various different forms, such as a fine powder, an aqueous dispersion, a powder mixture with an acrylonitrile/styrene copolymer (AS resin), and a powder mixture with polymethylmethacrylate (PMMA).

In the present invention, it is especially preferred to use a powder mixture of a fluoropolymer with an AS resin or PMMA. With respect to a powder mixture of a fluoropolymer with a thermoplastic resin, such as an AS resin or PMMA, reference can be made to Unexamined Japanese Patent Application Laid-Open Specification Nos. Hei 9-95583 (corresponding to U.S. Pat. No. 5,804,654), Hei 11-49912 (corresponding to U.S. Pat. No. 6,040,370), 2000-143966 and 2000-297189. Specific examples of such powder mixtures include Blendex™ 449 (manufactured and sold by GE Speciality Chemicals, U.S.A.) and Metablen™ A-3800 (manufactured and sold by Mitsubishi Rayon Co., Ltd., Japan).

In the present invention, component (D) is used in an amount of from 0.01 to 0.5 part by weight, preferably from 0.05 to 0.4 part by weight, more preferably from 0.1 to 0.35 part by weight, most preferably from 0.15 to 0.3 part by weight, relative to 100 parts by weight of component (A).

When component (D) is used in an amount of less than 0.01 part by weight, the dripping of flaming particles cannot be satisfactorily prevented when the thin molded article is on fire. On the other hand, when component (D) is used in an amount of more than 0.5 part by weight, the appearance of the molded article is likely to be spoiled, for example, by the occurrence of a silver streak.

For improving the melt fluidity or mechanical properties (such as impact resistance) of the aromatic polycarbonate resin composition used in the present invention, the resin composition may further contain a thermoplastic resin other than an aromatic polycarbonate in an amount up to 5 parts by weight, preferably up to 3 parts by weight, relative to 100 parts by weight of component (A).

Examples of thermoplastic resins other than an aromatic polycarbonate include a polystyrene resin, a polyphenylene ether resin, a polyolefin resin, a polyvinyl chloride resin, a polyamide resin, a polyester resin, a polyphenylenesulfide resin, a polymethacrylate resin and a rubber-modified polymer. These resins can be used individually or in combination.

Of the above-mentioned resins, it is preferred to use a polystyrene resin and/or a rubber-modified polymer. Examples of especially preferred polystyrene resins include an acrylonitrile/styrene copolymer resin (AS resin) and a polystyrene resin (PS). Examples of especially preferred rubber-modified polymers include an acrylonitrile/butadiene/styrene copolymer (ABS resin), a methyl methacrylate/butadiene/styrene copolymer (MBS resin), a methyl methacrylate/butadiene copolymer (MB resin), a methyl methacrylate/butyl acrylate copolymer (MBA resin), a methyl methacrylate/butyl acrylate/styrene copolymer (MBAS resin), an acrylontrile/butyl acrylate/styrene copolymer (AAS resin), and a high impact polystyrene (HIPS).

The aromatic polycarbonate resin composition used in the present invention may further contain an additive, such as a coloring agent, a dispersant, a thermal stabilizer, a light stabilizer, a lubricant, a mold release agent and an antistatic agent. The amount of the additive(s) used is generally up to 5 parts by weight, relative to 100 parts by weight of component (A).

In the present invention, when titanium oxide and/or zinc sulfide is used as a coloring agent, these inorganic compounds are not considered as component (B).

Moreover, the aromatic polycarbonate resin composition used in the present invention may further contain a fibrous reinforcing agent. Examples of fibrous reinforcing agents include a glass fiber, a carbon fiber, an alumina fiber, a zirconia fiber, a boron nitride fiber, a silicon carbide fiber, an aramid fiber and a liquid crystal polyester. These fibrous reinforcing agents can be used individually or in combination.

When a fibrous reinforcing agent is used, it is preferred that the amount of the fibrous reinforcing agent is from 1 to 30% by weight, more advantageously from 5 to 25% by weight, still more advantageously from 10 to 20% by weight, based on the weight of the aromatic polycarbonate resin composition used in the present invention.

Hereinbelow, an explanation is given with respect to a method for producing the aromatic polycarbonate resin composition used in the present invention.

The aromatic polycarbonate resin composition used in the present invention can be produced by subjecting components (A), (B), (C) and (D), and optionally the above-mentioned other components to melt-kneading using a melt-kneading apparatus, such as a Banbury mixer, a kneader, a single-screw extruder or a twin-screw extruder. For continuously producing the resin composition by uniformly mixing the above-mentioned components, a twin-screw extruder is most suitable.

A most preferred production method is a melt-kneading method using a twin-screw extruder having an LE/DE ratio (i.e., ratio of the length (LE) of the extruder in an extrusion direction to the diameter (DE) of a screw of the extruder) of from 5 to 100, preferably from 10 to 70, more preferably from 20 to 50.

In the production of the aromatic polycarbonate resin composition used in the present invention, there is no particular limitation with respect to the form of the aromatic polycarbonate (A), and the aromatic polycarbonate (A) may be in the form of, for example, pellets or a powder, or in a molten form, preferably in the form of pellets or a powder.

The production of the resin composition used in the present invention may be performed by a method in which the above-mentioned components are premixed in a premixing apparatus, such as a tumbler or a ribbon blender, and the resultant mixture is subjected to melt-kneading using an extruder to thereby produce the resin composition used in the present invention. When the above-mentioned fibrous reinforcing agent is used, it is preferred to feed the fibrous reinforcing agent from a side feeder of the extruder, separately from the other components.

When an extruder is used in the production of the resin composition used in the present invention, the melt-kneading may be performed under conditions wherein the cylinder temperature of the extruder is in the range of from 200 to 400° C., preferably from 220 to 350° C., more preferably from 230 to 300° C., the revolution rate of the screw is in the range of from 50 to 700 rpm, preferably from 80 to 500 rpm, more preferably from 100 to 300 rpm, and the average residence time of a molten resin mixture in the extruder is in the range of from 10 to 150 seconds, preferably from 20 to 100 seconds, more preferably 30 to 60 seconds. During the melt-kneading, the temperature of the molten resin composition in the extruder is preferably maintained within the range of from 250 to 330° C., so as to prevent the resin from being excessively heated during the melt-kneading. The resultant resin composition obtained by the melt-kneading is extruded in the form of a strand from a die provided at an end portion of the extruder and, then, pelletized to thereby obtain the resin composition in the form of pellets.

With respect to the method for producing the resin composition used in the present invention, it is preferred that a devolatilization is performed simultaneously with the melt-kneading. The "devolatilization" means the removal of volatile matters generated during the melt-kneading through a vent of an extruder under atmospheric pressure or reduced pressure.

When the above-mentioned devolatilization is performed under reduced pressure, the pressure is preferably from 1 to $5 \times 10^4$ Pa, more preferably from 10 to $4 \times 10^4$ Pa, still more preferably from 100 to $2 \times 10^4$ Pa.

Hereinbelow, an explanation is given with respect to the molded article of the present invention.

The molded article of the present invention is produced by injection molding of the molten form of the flame-retardant aromatic polycarbonate resin composition described above. The molded article has the largest value of FL/t ratios of 50 or more, wherein FL represent a flow length of the resin composition in the mold and t represents a thickness of the molded article, wherein the FL/t ratios are obtained by a method comprising:

measuring the thicknesses of the molded article at portions thereof which, respectively, correspond to flow paths (L) of the molten form of the resin composition in the mold during the injection molding, the flow paths (L) extending from the gate of the mold to points in the mold at which the flow of the molten form of the resin composition stops, and calculating an integral of (dL/t') along each of the flow paths (L), wherein dL represents the length of a segment of flow path (L) and t' represents the thickness of the molded article at a portion thereof which corresponds to the segment, wherein the integrals respectively calculated with respect to the flow paths (L) are defined as the FL/t ratios of the molded article.

The above-mentioned largest value (hereinafter, referred to as "$(\int dL/t')_{max}$") of FL/t ratios of the molded article is preferably 60 or more, more preferably 70 or more, still more preferably 80 or more.

With respect to the method for obtaining $(\int dL/t')_{max}$, a more specific explanation is given below.

The molten form of flame-retardant aromatic polycarbonate resin composition charged into a mold through gate (a) flows in the mold through various flow paths. For example, a certain portion of the molten resin composition flows from gate (a) and reaches the mold inner wall where the molten resin composition stops the flowing, whereas other certain portions of the molten resin composition, which portions have respectively flowed through different flow paths, collide with each other and stop the flowing at a portion which becomes a weld line of the resultant molded article. The point in the mold at which a flow of the molten resin composition stops is defined as "flow-end point (b)". Needless to say, during the injection molding of a resin composition, there are a plurality of flow-end points (b) in the mold. Each of the flow paths formed between gate (a) and flow-end points (b) is defined as "flow path (L)".

The flow-end points (b) correspond to edge portions and weld lines of the molded article. Therefore, the flow-end points (b) can be confirmed by observation of the molded article. The formation of the flow paths (L) of the molten resin composition which has been charged into the mold through the gate (a) is influenced by the position of the molten resin composition in the mold and the inner structure of the mold (i.e., shape of the molded article to be produced). Taking these influences into consideration, the flow paths (L) and the flow-end points (b) can be determined by observing the obtained molded article. Alternatively, the flow paths (L) and the flow-end points (b) can also be determined as follows. An injection molding operation in which a mold used is not filled with a resin composition (i.e., the so-called "short shot molding") is repeatedly performed, while increasing the amount of a resin composition charged into the mold, thereby obtaining molded articles having various different shapes. By observing the obtained molded articles, the movement of the resin composition in the mold can be evaluated and, hence, it becomes possible to determine the flow paths (L) and the flow-end points (b).

Then, the thicknesses of the molded article are measured at portions thereof which, respectively, correspond to the flow paths (L). Then, with respect to each of the flow paths (L), the sum of the ratio (dL/t') of the length (dL) of a segment of a flow path (L) to the thickness (t') of the molded article at a portion thereof which corresponds to the segment is calculated. That is, along each of the flow paths (L), an integral of (dL/t') (hereinafter, frequently referred to as "∫dL/t'") is calculated. The integrals (∫dL/t') respectively calculated with respect to the flow paths (L) are defined as the flow length/thickness ratios (FL/t ratios) of the molded article, and the largest value thereof (($\int dL/t'$)$_{max}$) is determined.

The "thickness (t') of the molded article" means the thickness that is the minimum among the thicknesses of the molded article as measured with respect to a segment of a flow path (L) in a direction perpendicular to the flow path (L).

In the present invention, theoretically, ($\int dL/t'$)$_{max}$ needs to be the largest value of FL/t ratios obtained with respect to all flow paths (L) of the molten resin composition in the mold during the injection molding. However, in the actual determination of ($\int dL/t'$)$_{max}$, it is not always necessary to obtain the FL/t ratios with respect to all flow paths (L), and the flow paths (L) at which the FL/t ratios are obtained can be appropriately selected depending on the shape of the molded article. For example, when the thickness of the molded article is relatively uniform, the integral (∫dL/t') value calculated along the longest flow path (L) can be used as ($\int dL/t'$)$_{max}$ of the molded article. On the other hand, when the thickness of the molded article is non-uniform, flow paths (L) which appear to have large (∫dL/t') values are selected, taking into consideration the lengths of flow paths (L) and the thicknesses of the molded article at portions thereof which, respectively, correspond to the flow paths (L). Then, with respect to each of the selected flow paths (L), the integral (∫dL/t') value is calculated, and the largest value of the obtained integral (∫dL/t') values is defined as ($\int dL/t'$)$_{max}$.

The thin molded article of the present invention (produced from the above-mentioned flame-retardant aromatic polycarbonate resin composition) is advantageous in that it has excellent flame retardancy as well as excellent heat resistance. Further, in the injection molding for producing the thin molded article of the present invention, since the above-mentioned flame-retardant aromatic polycarbonate resin composition has an excellent melt fluidity, the number of gates for introduction of a molten resin composition into a mold can be reduced, so that a mold having a simple structure can be used. Thus, it becomes possible to reduce the number of weld lines and gate marks on a molded article, thereby enabling the production of a molded article having an excellent appearance and an excellent strength. Therefore, the thin molded article of the present invention has a high commercial value.

In the present invention, it is preferred that the molded article of a flame-retardant aromatic polycarbonate resin composition has at least one thin portion having a thickness of 2.0 mm or less, wherein the ratio of the at least one thin portion is 50% by weight or more, more advantageously 60% by weight or more, still more advantageously 70% by weight or more, based on the weight of the molded article. The thickness of the thin portion is more preferably 1.5 mm or less, still more preferably 1.0 mm or less.

Further, in the present invention, it is preferred that the molded article has at least one functional portion selected from the group consisting of a boss, a rib, a pin and a corner.

The above-mentioned "boss" means a protruded thick portion of a molded article, which is formed around a hole, a screw, a cutout, an inserted portion, etc. of the molded article for the purpose of reinforcement.

The above-mentioned "rib" means a ridge portion (pleat) or a supporting portion of a molded article, which is formed for improving the stiffness and strength of the molded article.

The above-mentioned "pin" means a long rod-shaped protruded portion of a molded article.

The above-mentioned "corner" means a portion of a molded article, which has an L-shaped cross-section.

In the present invention, with respect to the above-mentioned at least one functional portion selected from the group consisting of a boss, a rib, a pin and a corner, edge portions thereof may be rounded (i.e., may be radiused).

The molded article of the present invention can be advantageously used as housings or parts of various devices, such as computers (e.g., a notebook computer), copying machines, fax machines, printers, projectors, portable devices, electric and electronic appliances, and high precision machines. When a molded article is used as housings or parts as mentioned above, the molded article generally has a functional portion as mentioned above. That is, the molded article of the present invention which has a functional portion as mentioned above is a molded article having a three-dimensional structure, which can be used as housings or parts as mentioned above, differing from a molded article (test specimen) used for various tests which is in the form of a cylindrical rod, a rectangular rod, a strip, a dumbbell, a plate, a disc or the like. In the present invention, the shape and size of the above-mentioned at least one functional portion can be appropriately selected depending on the use of the molded article.

As a preferred example of the method for producing the molded article of the present invention, there can be mentioned a method which comprises:

(1) charging a molten form of a flame-retardant aromatic polycarbonate resin composition into a mold by using an injection-molding machine, the flame-retardant aromatic polycarbonate resin composition comprising:

100 parts by weight of an aromatic polycarbonate (A) having a weight average molecular weight of from 17,000 to 35,000, 0.01 to 3 parts by weight of inorganic compound particles (B) having an average particle diameter of from 10 nm to 10 μm, 0.001 to 0.5 part by weight of an alkali metal salt (C) of an organic sulfonic acid, and 0.01 to 0.5 part by weight of a fluoropolymer (D), wherein the temperature ($T_M$:° C.) of the molten form of the resin composition charged into the mold satisfies the following formula (1):

$$0.005Mw+175 \leq T_M \leq 350 \quad (1)$$

wherein Mw represents the weight average molecular weight of aromatic polycarbonate (A), (2) cooling the resin composition in the mold to thereby form a molded article in the mold, and (3) recovering the molded article from the mold.

In the method of the present invention, it is preferred that the temperature ($T_M$) of the molten form of the resin composition charged into the mold satisfies the following formula (2):

$$0.005Mw+180 \leq T_M \leq 345 \quad (2), \text{ and}$$

it is more preferred that the temperature ($T_M$) of the molten form of the resin composition charged into the mold satisfies the following formula (3):

$$0.005Mw+185 \leq T_M \leq 340 \quad (3).$$

When the above-mentioned temperature ($T_M$) of the molten form of the resin composition is lower than the lower limit of formula (1) above, the melt fluidity of the resin composition becomes insufficient to obtain a thin molded article. On the other hand, when the temperature ($T_M$) is higher than the upper limit of formula (1) above, the melt stability of the resin composition is lowered, so that disadvantages are caused in that the strength and impact resistance of the obtained molded article are lowered, that the appearance of the obtained molded article is spoiled, and that there is a tendency that the dripping of flaming particles cannot be satisfactorily prevented when the molded article is on fire.

In the method of the present invention, the mold temperature is generally in the range of from 30 to 135° C., preferably from 50 to 130° C., more preferably from 60 to 125° C., still more preferably from 70 to 120° C., most preferably from 80 to 115° C.

As examples of the fields in which the molded article of the present invention and the method of the present invention can be used, there can be mentioned housings or parts of various devices, such as computers (e.g., a notebook computer), copying machines, facsimile machines, printers, projectors, portable devices, electric and electronic appliances, and high precision machines.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, aromatic polycarbonate resin compositions were produced using the following components (A), (B), (C) and (D), and other components.

1. Component (A): Aromatic Polycarbonate

The following substances (PC-1) to (PC-6) are used as component (A).

(PC-1): A bisphenol A polycarbonate produced by a melt transesterification process described in U.S. Pat. No. 5,840,826, which has a weight average molecular weight (Mw) of 21,100.

(PC-2): A bisphenol A polycarbonate produced by phosgene process, which has a weight average molecular weight (Mw) of 20,500.

(PC-3): A bisphenol A polycarbonate produced in substantially the same manner as in the production of (PC-1) (i.e., bisphenol A polycarbonate produced by a melt transesterification process described in U.S. Pat. No. 5,840,826), which has a weight average molecular weight (Mw) of 25,800.

(PC-4): A bisphenol A polycarbonate produced by phosgene process, which has a weight average molecular weight (Mw) of 30,000.

(PC-5): A bisphenol A polycarbonate produced in substantially the same manner as in the production of (PC-1) (i.e., bisphenol A polycarbonate produced by a melt transesterification process described in U.S. Pat. No. 5,840,826), which has a weight average molecular weight (Mw) of 15,500 and, hence, does not satisfy the molecular weight requirement (Mw=17,000 to 35,000) of the present invention.

(PC-6): A bisphenol A polycarbonate produced in substantially the same manner as in the production of (PC-1) (i.e., bisphenol A polycarbonate produced by a melt transesterification process described in U.S. Pat. No. 5,840,826), which has a weight average molecular weight (Mw) of 36,500 and, hence, does not satisfy the molecular weight requirement (Mw=17,000 to 35,000) of the present invention.

2. Component (B): Inorganic Compound Particles

The following substances (B-1) to (B-3) are used as component (B).

(B-1): Silicon oxide particles (trade name: Aerosil RY200; manufactured and sold by Nippon Aerosil Co., Ltd., Japan) obtained by subjecting silicon oxide (produced by the dry method) to surface treatment with a polydimethylsiloxane.

(B-2): Silicon oxide particles (trade name: Aerosil 200; manufactured and sold by Nippon Aerosil Co., Ltd., Japan) produced by the dry method.

(B-3): Talc (trade name: MICROACE SG-2000; manufactured and sold by NIPPON TALC CO., LTD., Japan).

3. Component (C): Organic Sulfonic Acid Alkali Metal Salt

The following substances (C-1) and (C-2) are used as component (C).

(C-1): A purified potassium perfluorobutanesulfonate which was prepared as follows.

In a glass flask, 100 g of a commercially available potassium perfluorobutanesulfonate (trade name: MEGAFACE F-114; manufactured and sold by DAINIPPON INK & CHEMICALS INC., Japan) was completely dissolved in 500 ml of distilled water at 80° C., and the resultant aqueous solution was cooled to room temperature to recrystallize potassium perfluorobutanesulfonate. The resultant was subjected to filtration to recover crystals (formed by the recrystallization), and the crystals were dried at 80° C. for 24 hours to obtain powdery crystals. Then, the obtained powdery crystals were dissolved in 1,000 ml of purified ethanol in a glass flask, and the resultant mixture was subjected to filtration to remove insoluble matters therefrom, thereby obtaining an ethanol solution of potassium perfluorobutanesulfonate. Then, the obtained solution was subjected to evaporation using a rotary evaporator to remove the solvent therefrom, and the resultant was dried at 80° C. for 24 hours, thereby obtaining a purified potassium perfluorobutanesulfonate.

When the thus obtained purified potassium perfluorobutanesulfonate was subjected to thermogravimetric analysis using a thermogravimetric analyzer (manufactured and sold by Perkin Elmer, Inc., U.S.A.) under conditions wherein the temperature was elevated from room temperature at a temperature elevation rate of 10° C./min, and the atmosphere was a nitrogen atmosphere, the temperature at which the weight reduction of the purified potassium perfluorobutanesulfonate reached 5% by weight was 470° C.

The Ca content and Fe content of the purified potassium perfluorobutanesulfonate were measured by atomic absorption analysis, and found to be 0.3 ppm and 1.0 ppm, respectively. Further, the fluorine content of the purified potassium perfluorobutanesulfonate was measured by using a fluorine ion electrode, and found to be 2 ppm.

(C-2): Potassium diphenylsulfone-3-sulfonate (manufactured and sold by UCB Japan Co. Ltd., Japan).

When (C-2) was subjected to thermogravimetric analysis using a thermogravimetric analyzer (manufactured and sold by Perkin Elmer, Inc., U.S.A.) under conditions wherein the temperature was elevated from room temperature at a temperature elevation rate of 10° C./min, and the atmosphere was a nitrogen atmosphere, the temperature at which the weight reduction of (C-2) reached 5% by weight was 340° C.

4. Component (D): Fluoropolymer

The following substance (D-1) is used as component (D).

(D-1): A powder mixture (trade name: Blendex 449; manufactured and sold by GE Speciality Chemicals Inc., U.S.A.) of a polytetrafluoroethylene (PTFE) and an acrylonitrile/styrene copolymer (AS), which mixture has a PTFE/AS weight ratio of 50/50.

5. Other Components

The following substances were used as other components.

(I-1076) (hindered phenol type antioxidant): Octadecyl-3-(3,5-di-t-butyl-4-hydroxyphenyl)propionate (trade name: Irganox 1076; manufactured and sold by Ciba Speciality Chemicals, Japan).

(P-168) (phosphate heat stabilizer): tris(2,4-di-t-butylphenyl) phosphite (trade name: IRGAFOS 168; manufactured and sold by Ciba Speciality Chemicals, Japan).

(GF): Chopped strands (trade name: T-571; manufactured and sold by Nippon Electric Glass Co., Ltd., Japan).

(PETS): Pentaerythritol tetrastearate (trade name: Unister H476; manufactured and sold by NOF Corporation, Japan).

Further, in the following Examples and Comparative Examples, various measurements and analyses were conducted by the following methods.

(1) Melt Fluidity

The melt fluidity of an aromatic polycarbonate resin composition was evaluated as follows.

Using an injection molding machine (Autoshot 100D; manufactured and sold by FANUC LTD., Japan) and a spiral flow mold (thickness: 2 mm; width: 10 mm) for measurement of flow length, the largest flow length (unit: cm) of an aromatic polycarbonate resin composition in a molten form (i.e., the largest value of the lengths of the flow paths as defined above) was measured, and the obtained value was defined as the flow length of the resin composition. Specifically, the flow length of the molten resin composition was measured under conditions wherein the resin temperature was as indicated in Tables 1 to 4, the mold temperature was 80° C., and the injection molding pressure was 100 MPa.

Further, from the flow length of the molten resin composition, the FL/t ratio of the molded article was calculated, wherein FL represents the flow length of the molten resin composition and t represents a thickness of the molded article.

The thus obtained flow length and FL/t ratio of the resin composition was used as a yardstick for evaluating the melt fluidity of the resin composition.

In the actual designing of a mold used for producing resin molded articles on a commercial scale, for securing a satisfactory freedom with respect to the molding conditions (such as an injection rate and a dwell pressure) for the injection molding, it is preferred that the number of gates and the positions of the gates are appropriately selected so that there is no portion in the mold where the FL/t ratio of the molten resin becomes too large.

(2) Average Particle Diameter of Inorganic Compound Particles

An ultrathin specimen was cut out from an aromatic polycarbonate resin composition in the form of pellets. Then, a photomicrograph of the obtained specimen was taken using a transmission electron microscope (manufactured and sold by JEOL, LTD., Japan). Then, from the inorganic compound particles which were shown in the photomicrograph, 100 particles were chosen, and the areas of the 100 particles were measured. From the measured particle areas of the magnified particles, the actual areas (S) of the particles are obtained by dividing the measured areas of the magnified particles by the magnification of the microscope. From the thus obtained actual areas S, the particle diameters of the inorganic compound particles are calculated by the formula $(4S/\pi)^{0.5}$. From the calculated diameters of the inorganic compound particles, the number average particle diameter of the particles is calculated and defined as the average particle diameter (unit: nm) of inorganic compound particles (component (B)).

(3) Flame Retardancy

An aromatic polycarbonate resin composition was subjected to an injection molding using an injection molding machine (trade name: Autoshot 100D; manufactured and sold by FANUC LTD., Japan) at a resin temperature indicated in Tables 1 to 4 and a mold temperature of 80° C., to thereby obtain strip specimens having different thicknesses (thickness: 1.50 mm, 1.20 mm and 1.00 mm). The strip specimens were maintained at 23° C. under a humidity of 50% for two days. With respect to each of the resultant strip specimens, the flame retardancy thereof was evaluated by the 20 mm Vertical Burning Test described in UL-subject 94. More specifically, the tests for "V-0", "V-1" and "V-2" as prescribed in UL-subject 94 were performed, wherein the level of the flame retardancy is as follows: V-0>V-1>V-2.

(4) Heat Distortion Temperature

An aromatic polycarbonate resin composition was subjected to an injection molding using an injection molding machine (trade name: Autoshot 100D; manufactured and sold by FANUC LTD., Japan) at a resin temperature indicated in Tables 1 to 4 and a mold temperature of 80° C., to thereby obtain a test specimen. With respect to the obtained test specimen, the heat distortion temperature (unit: ° C.) thereof was measured in accordance with ISO-75-1 under a load of 1.82 MPa.

(5) Impact Resistance

An aromatic polycarbonate resin composition was subjected to an injection molding using an injection molding machine (trade name: Autoshot 50D; manufactured and sold by FANUC LTD., Japan) at a resin temperature indicated in Tables 1 to 4 and a mold temperature of 80° C., to thereby obtain a notched specimen having a thickness of 1/8 inch. With respect to the obtained specimen, the impact strength (unit: J/m) thereof was measured in accordance with ASTM D256.

(6) Melt Stability

An aromatic polycarbonate resin composition was retained in an injection molding machine (trade name: Autoshot 50D; manufactured and sold by FANUC LTD., Japan) at a resin temperature indicated in Tables 2 to 4 for 20 minutes. Then, from the resultant resin composition in a molten form was produced a notched specimen having a thickness of 1/8 inch. With respect to the produced specimen, the Izod impact strength (unit: J/m) thereof was measured in accordance with ASTM D256.

The above-mentioned measurement was performed using 5 specimens, and the number of specimens which had suffered brittle fracture was counted.

(7) Heat Resistance of a Molded Article

An aromatic polycarbonate resin composition was subjected to an injection molding using an injection molding machine (trade name: Autoshot 100D; manufactured and sold by FANUC LTD., Japan) at a resin temperature indicated in Table 1, to thereby obtain a box-shaped article having a bottom of 170 mm×96 mm (outer size), a height of 50 mm and a wall thickness of 2 mm. The mold used for producing the above-mentioned box-shaped article had one pin gate having a diameter of 1 mmφ, which was positioned at a portion corresponding to the center of the bottom of the box-shaped article.

With respect to the obtained box-shaped article, the heat resistance thereof was evaluated by the following methods (a) and (b).

(a) A box-shaped article was allowed to stand in an oven at 120° C. for 500 hours. Then, the resultant box-shaped article was withdrawn from the oven, and the change in the shape thereof was examined by visual observation.

(b) A box-shaped article other than used in the method (a) above was allowed to stand for 500 hours under conditions wherein the temperature was 80° C. and the relative humidity (RH) was 95%. Then, the resultant box-shaped article was examined by visual observation to evaluate the change in the shape thereof.

EXAMPLE 1

An aromatic polycarbonate resin composition was produced in accordance with the formulation shown in Table 1. Specifically, the production of the aromatic polycarbonate resin composition was performed as follows.

A melt-kneading of the materials indicated in Table 1 was performed by means of a twin-screw extruder (trade name: PCM-30; manufactured and sold by Ikegai Corporation, Japan) (LE/DE=28) under conditions wherein the cylinder temperature was 265° C., the screw revolution rate was 150 rpm, and the extrusion rate of the resultant resin composition was 15 kg/hr. During the melt-kneading, the temperature of the molten resin composition in the extruder was measured by means of a thermocouple which was provided at the die of the extruder. As a result, it was found that the resin temperature was 278° C.

With respect to the feeding of the materials, each of the components indicated in Table 1 were preblended together for 20 minutes using a tumbler, and the resultant mixture was introduced into the extruder by means of a gravimetric feeder. Further, during the melt-kneading, a devolatilization was performed through a vent provided at a downstream portion of the extruder under reduced pressure, namely under a pressure of $2 \times 10^4$ Pa. After the melt-kneading, the resultant resin composition was extruded from the die in the form of a strand, and the obtained strand was pelletized, thereby obtaining an aromatic polycarbonate resin composition in the form of pellets.

The obtained pellets were dried at 120° C. for 5 hours. From the dried pellets, test specimens were produced, and various properties of the resin composition were evaluated using the test specimens. Further, with respect to the test specimen used for measuring the heat resistance of the resin composition, the largest value $[(\int dL/t')_{max}]$ of the FL/t ratios was measured and found to be 73.5.

The results are shown in Table 1.

EXAMPLE 2

An aromatic polycarbonate resin composition was produced in accordance with the formulation shown in Table 1.

In Example 2, pellets of the resin composition were produced in substantially the same manner as in Example 1, except that GF was further added.

The obtained pellets were dried at 120° C. for 5 hours. From the dried pellets, test specimens were produced, and various properties of the resin composition were evaluated using the obtained test specimens. Further, with respect to the test specimen used for measuring the heat resistance of the resin composition, the largest value $[(\int dL/t')_{max}]$ of the FL/t ratios was measured and found to be 73.5.

The results are shown in Table 1.

COMPARATIVE EXAMPLE 1

A flame-retardant polycarbonate/ABS resin composition was produced by melt-kneading the following substances (a) to (g) and a phosphorus-containing flame retardant using a twin-screw extruder (trade name: PCM-30; manufactured and sold by Ikegai Corporation, Japan) (LE/DE=28). Specifically, the melt-kneading was performed under conditions wherein the cylinder temperature was 250° C., the screw revolution rate was 150 rpm, and the extrusion rate of the resultant resin composition was 15 kg/hr. The produced resin composition was subjected to various evaluations. In the melt-kneading, phosphorus-containing flame retardant was introduced into the extruder by means of a gear pump provided at a middle portion of the extruder.

The formulation of the polycarbonate/ABS resin composition was as follows.

(a): 80 Parts by weight of a bisphenol A polycarbonate produced by a melt transesterification process, which has a weight average molecular weight of 22,500.

(b): 10 Parts by weight of a powdery acrylonitrile/butadiene/styrene copolymer (ABS resin).

The powdery ABS resin was produced by performing an emulsion polymerization, followed by solidification of the resultant polymerization product by salting-out using sulfuric acid, and subsequent washing and drying. The powdery ABS resin had a butadiene rubber content of 60% by weight, an average particle diameter of 0.26 μm, and a ratio of grafted components (i.e., styrene/acrylonitrile weight ratio) of 73/27.

(c): 10 Parts by weight of an acrylonitrile/styrene resin (AS resin) having an acrylonitrile monomer unit content of 27% by weight, a styrene monomer unit content of 73% by weight and a weight average molecular weight (Mw) of 100,000.

(d): 15 Parts by weight of a resorcinol bis(diphenylphosphate)-type oligomeric phosphoric ester (trade name: CR-733S; manufactured and sold by Daihachi Chemical Industry Co., Ltd., Japan) (acid value: 0.01 mgKOH/g).

(e): 0.6 Part by weight of the powder mixture of polytetrafluoroethylene and acrylonitrile/styrene copolymer (D-1) used in Example 1 (i.e., 0.3 part by weight of polytetrafluoroethylene).

(f): 0.1 Part by weight of octadecyl-3-(3,5-di-t-butyl-4-hydroxyphenyl)propionate (I-1076) used in Example 1.

(g): 0.05 Part by weight of tris(2,4-di-t-butylphenyl) phosphite (P-168) used in Example 1.

In Comparative Example 1, the obtained resin composition was pelletized and dried at 90° C. for 4 hours. From the dried pellets, test specimens were produced, and various properties of the resin composition were evaluated using the obtained test specimens. With respect to the test specimen used for measuring the heat resistance of the resin composition, the largest value $[(\int dL/t')_{max}]$ of the FL/t ratios was measured and found to be 73.5.

The results are shown in Table 1.

COMPARATIVE EXAMPLE 2

A flame-retardant polycarbonate/GF resin composition was produced by melt-kneading the following substances (a) to (f) and a phosphorus-containing flame retardant using a twin-screw extruder (trade name: PCM-30; manufactured and sold by Ikegai Corporation, Japan) (LE/DE=28). Specifically, the melt-kneading was performed in the same manner as in Comparative Example 1 (i.e., the melt-kneading was performed under conditions wherein the cylinder temperature was 250° C., the screw revolution rate was 150 rpm, and the extrusion rate of the resultant resin composition was 15 kg/hr). The produced resin composition was subjected to various evaluations. In the melt-kneading, phosphorus-containing flame retardant was introduced into the extruder by means of a gear pump provided at a middle portion of the extruder.

The formulation of the polycarbonate/GF resin composition was as follows.

(a): 80 Parts by weight of a bisphenol A polycarbonate produced by a melt transesterification process, having a weight average molecular weight of 22,500.

(b): 15 Parts by weight of a resorcinol bis(diphenylphosphate)-type oligomeric phosphoric ester (trade name: CR-733S; manufactured and sold by Daihachi Chemical Industry Co., Ltd., Japan) (acid value: 0.01 mgKOH/g).

(c): 0.10 Part by weight of the powder mixture of polytetrafluoroethylene and acrylonitrile/styrene copolymer (D-1) used in Example 1 (i.e., 0.5 part by weight of polytetrafluoroethylene).

(d): 25 Parts by weight of chopped strands (GF) used in Example 2.

(e): 0.1 Part by weight of octadecyl-3-(3,5-di-t-butyl-4-hydroxyphenyl)propionate (I-1076) used in Example 1.

(f): 0.05 Part by weight of tris(2,4-di-t-butylphenyl) phosphite (P-168) used in Example 1.

In Comparative Example 2, the obtained resin composition was pelletized and dried at 90° C. for 4 hours. From the dried pellets, test specimens were produced, and various properties of the resin composition were evaluated using the obtained test specimens. With respect to the test specimen used for measuring the heat resistance of the resin composition, the largest value $[(\int dL/t')_{max}]$ of the FL/t ratios was measured and found to be 73.5. The results are shown in Table 1.

TABLE 1

|  | Example 1 | Example 2 | Comp. Ex. 1 | Comp. Ex. 2 |
|---|---|---|---|---|
| Component (A) PC-1 [part by weight] | 100 | 100 | *2) | *3) |
| Component (B) B-1 [part by weight] | 0.4 | 0.4 |  |  |
| Component (C) C-1 [part by weight] | 0.15 | 0.15 |  |  |
| Component (D) D-1*1) [part by weight] | 0.6 | 0.6 |  |  |
| Other components |  |  |  |  |
| GF [part by weight] | 0 | 25 |  |  |
| I-1076 [part by weight] | 0.05 | 0.05 |  |  |
| P-168 [part by weight] | 0.02 | 0.02 |  |  |
| Resin temperature [° C.] | 300 | 300 | 250 | 290 |
| Average particle diameter of component (B) [nm] | 92 | 88 | — | — |
| UL-94 flame retardancy |  |  |  |  |
| Sample thickness: 1.5 mm | V-0 | V-0 | V-0 | V-0 |
| Sample thickness: 1.2 mm | V-0 | V-0 | V-2 | V-0 |
| Sample thickness: 1.0 mm | V-0 | V-1 | V-2 | — |
| Heat distortion temperature [° C.] | 124 | 139 | 82 | 95 |
| Impact resistance [J/m] | 630 | 85 | 580 | 70 |

TABLE 1-continued

|  | Example 1 | Example 2 | Comp. Ex. 1 | Comp. Ex. 2 |
|---|---|---|---|---|
| Heat resistance of the molded article | | | | |
| (a) Heat distortion after maintaining at 120° C. for 500 hours | No distortion | No distortion | Large distortion*4) | Large distortion*4) |
| (b) Heat distortion after maintaining at 80° C. for 500 hours | No distortion | No distortion | Large distortion*5) | Large distortion*5) |

Notes:
"—" means that the measurement was not performed.
*1)The PTFE content of D-1 was 50% by weight.
*2) Flame-retardant PC/ABS resin composition (using a phosphorus-containing flame retardant)
*3) Flame-retardant PC/GF resin composition (using a phosphorus-containing flame retardant)
*4)The surface of the molded article was softened.
*5)Blister, warpage and surface roughening were observed.

From Examples 1 and 2 and Comparative Examples 1 and 2, it is apparent that the molded article of the present invention is an injection-molded article which has not only has a large FL/t ratio (i.e., a very small thickness), but also excellent flame retardancy and heat resistance.

Further, from the comparison between Example 1 and Comparative Example 1 and the comparison between Example 2 and Comparative Example 2, it is apparent that the molded article of the present invention can maintain the shape thereof up to a temperature near the heat distortion temperature (as measured in accordance with ISO-75-1 under a load of 1.82 MPa), whereas the molded articles produced in Comparative Examples 1 and 2 suffered heat distortion even at a temperature lower than the heat distortion temperature.

EXAMPLE 3

An aromatic polycarbonate resin composition was produced in substantially the same manner as in Example 1, except that the resin composition was produced in accordance with the formulation shown in Table 2.

The obtained resin composition was pelletized and dried at 120° C. for 5 hours. Using the dried pellets, various properties of the resin composition were evaluated. The results are shown in Table 2.

COMPARATIVE EXAMPLE 3

An aromatic polycarbonate resin composition was produced in substantially the same manner as in Example 1, except that the resin composition was produced in accordance with the formulation shown in Table 2.

The obtained resin composition was pelletized and dried at 120° C. for 5 hours. Using the dried pellets, various properties of the resin composition were evaluated. The results are shown in Table 2.

COMPARATIVE EXAMPLES 4 AND 5

In Comparative Examples 4 and 5, the resin composition obtained in Example 3 was molded at resin temperatures of 260° C. and 360° C., respectively. With respect to the obtained molded articles, various properties thereof were evaluated. The results are shown in Table 2.

From the results, it is apparent that the molded article produced in Comparative Example 4 had poor melt fluidity, and that the molded article produced in Comparative Examples 5 had poor flame retardancy and melt stability.

TABLE 2

|  | Example 3 | Comp. Ex. 3 | Comp. Ex. 4 | Comp. Ex. 5 |
|---|---|---|---|---|
| Component (A) PC-1 [part by weight] | 100 | 100 | 100 | 100 |
| Component (B) B-1 [part by weight] | 0.3 | 0 | 0.3 | 0.3 |
| Component (C) C-1 [part by weight] | 0.1 | 0 | 0.1 | 0.1 |
| Component (D) D-1*1) [part by weight] | 0.5 | 0 | 0.5 | 0.5 |
| Other components | | | | |
| I-1076 [part by weight] | 0.05 | 0.05 | 0.05 | 0.05 |
| P-168 [part by weight] | 0.02 | 0.02 | 0.02 | 0.02 |
| Resin temperature [° C.] | 310 | 310 | 260 | 360 |
| Melt fluidity | | | | |
| Flow length [cm] | 32 | 31 | 18 | 75 |
| Flow length/thickness ratio | 160 | 155 | 90 | 375 |
| Average particle diameter of component (B) [nm] | 86 | — | 86 | 86 |
| UL-94 Flame retardancy | | | | |
| Sample thickness: 1.5 mm | V-0 | V-2 | V-0 | V-2 |
| Sample thickness: 1.2 mm | V-0 | — | V-0 | — |
| Sample thickness: 1.0 mm | V-0 | — | V-0 | — |
| Heat distortion temperature [° C.] | 124 | 126 | 123 | 124 |
| Impact resistance [J/m] | 630 | 645 | 660 | 110 |
| Melt stability (after the retention for 20 minutes) | | | | |
| Izod impact strength [J/m] | 610 | 640 | 650 | 95 |
| Brittle fracture [number of specimen] | 0 | 0 | 0 | 5 |

Notes:
"—" means that the measurement was not performed.
*1)The PTFE content of D-1 was 50% by weight.

EXAMPLES 4 TO 7

In each of Examples 4 to 7, an aromatic polycarbonate resin composition was produced in substantially the same manner as in Example 1, except that the resin composition was produced in accordance with the formulation shown in Table 3, and various properties thereof were evaluated.

The results are shown in Table 3.

TABLE 3

|  | Example 4 | Example 5 | Example 6 | Example 7 |
|---|---|---|---|---|
| Component (A) | | | | |
| PC-1 [part by weight] | 100 | 0 | 0 | 0 |
| PC-2 [part by weight] | 0 | 100 | 0 | 0 |
| PC-3 [part by weight] | 0 | 0 | 100 | 0 |
| PC-4 [part by weight] | 0 | 0 | 0 | 100 |
| Component (B) | | | | |
| B-1 [part by weight] | 0 | 0 | 0.5 | 0.3 |
| B-2 [part by weight] | 0.3 | 0 | 0 | 0 |
| B-3 [part by weight] | 0 | 0.3 | 0 | 0 |
| Component (C) | | | | |
| C-1 [part by weight] | 0.01 | 0.01 | 0 | 0.1 |
| C-2 [part by weight] | 0 | 0 | 0.15 | 0 |
| Component (D) | 0.4 | 0.4 | 0.6 | 0.6 |
| D-1[1)] [part by weight] | | | | |
| Other components | | | | |
| I-1076 [part by weight] | 0.05 | 0.05 | 0.05 | 0.02 |
| P-168 [part by weight] | 0.02 | 0.02 | 0.02 | 0.02 |
| PETS [part by weight] | 0.2 | 0.2 | 0.2 | 0 |
| Resin temperature [° C.] | 305 | 305 | 320 | 340 |
| Melt fluidity | | | | |
| Flow length [cm] | 32 | 33 | 25 | 25 |
| Flow length/thickness ratio | 160 | 165 | 125 | 125 |
| Average particle diameter of component (B) [nm] | 110 | 870 | 88 | 88 |
| UL-94 Flame retardancy | | | | |
| Sample thickness: 1.5 mm | V-0 | V-0 | V-0 | V-0 |
| Sample thickness: 1.2 mm | V-0 | V-0 | — | — |
| Sample thickness: 1.0 mm | — | — | V-0 | V-0 |
| Heat distortion temperature [° C.] | 124 | 124 | 123 | 123 |
| Impact resistance [J/m] | 650 | 645 | 640 | 680 |
| Melt stability (after the retention for 20 minutes) | | | | |
| Izod impact strength [J/m] | 640 | 635 | 620 | 645 |
| Brittle fracture [number of specimen] | 0 | 0 | 0 | 0 |

Notes:
"—" means that the measurement was not performed.
[*1)]The PTFE content of D-1 was 50% by weight.

COMPARATIVE EXAMPLES 6 TO 12

In each of Comparative Examples 6 to 12, an aromatic polycarbonate resin composition was produced in substantially the same manner as in Example 1, except that the resin composition was produced in accordance with the formulation shown in Table 4, and the properties thereof were evaluated. The results are shown in Table 4.

TABLE 4

|  | Comp. Ex. 6 | Comp. Ex. 7 | Comp. Ex. 8 | Comp. Ex. 9 | Comp. Ex. 10 | Comp. Ex. 11[*2)] | Comp. Ex. 12 |
|---|---|---|---|---|---|---|---|
| Component (A) | | | | | | | |
| PC-1 [part by weight] | 100 | 100 | 100 | 100 | 0 | 0 | 0 |
| PC-4 [part by weight] | 0 | 0 | 0 | 0 | 100 | 0 | 0 |
| Polycarbonates which do not satisfy the requirement of component (A) | | | | | | | |
| PC-5 [part by weight] | 0 | 0 | 0 | 0 | 0 | 100 | 0 |
| PC-6 [part by weight] | 0 | 0 | 0 | 0 | 0 | 0 | 100 |
| Component (B) | | | | | | | |
| B-1 [part by weight] | 0 | 5 | 0.3 | 0.3 | 0.3 | 0.3 | 0.3 |
| Component (C) | | | | | | | |
| C-1 [part by weight] | 0.1 | 0.1 | 0 | 1 | 0.1 | 0.1 | 0.1 |
| Component (D) | | | | | | | |
| D-1[*1)] [part by weight] | 0.5 | 0.5 | 0.5 | 0.5 | 0.5 | 0.5 | 0.5 |
| Other components | | | | | | | |
| I-1076 [part by weight] | 0.02 | 0.02 | 0.02 | 0.02 | 0.02 | 0.02 | 0.02 |
| P-168 [part by weight] | 0.02 | 0.02 | 0.02 | 0.02 | 0.02 | 0.02 | 0.02 |
| Resin temperature [° C.] | 310 | 310 | 310 | 310 | 310 | 310 | 340 |
| Melt fluidity | | | | | | | |
| Flow length [cm] | 33 | 35 | 32 | 45 | 15 | 55 | 18 |
| Flow length/thickness ratio | 165 | 175 | 160 | 225 | 75 | 275 | 90 |

TABLE 4-continued

|  | Comp. Ex. 6 | Comp. Ex. 7 | Comp. Ex. 8 | Comp. Ex. 9 | Comp. Ex. 10 | Comp. Ex. 11[*2)] | Comp. Ex. 12 |
|---|---|---|---|---|---|---|---|
| Average particle diameter of component (B) [nm] | 86 | 105 | 83 | 90 | 85 | 88 | 92 |
| UL-94 Flame retardancy |  |  |  |  |  |  |  |
| Sample thickness: 1.5 mm | V-0 | V-0 | V-2 | V-0 | V-0 | V-0 | V-0 |
| Sample thickness: 1.2 mm | V-2 | V-2 | — | — | — | V-2 | V-0 |
| Sample thickness: 1.0 mm | V-2 | V-2 | — | V-2 | V-0 | — | — |
| Heat distortion temperature [° C.] | 124 | 123 | 124 | 123 | 124 | 122 | 124 |
| Impact resistance [J/m] | 625 | 560 | 630 | 78 | 650 | 95 | 690 |
| Melt stability (after the retention for 20 minutes) |  |  |  |  |  |  |  |
| Izod impact strength [J/m] | 610 | 240 | 620 | 95 | 640 | 85 | 650 |
| Brittle fracture [number of specimen] | 0 | 4 | 0 | 5 | 0 | 5 | 0 |

Notes:
"—" means that the measurement was not performed.
[*1)]The PTFE content of D-1 was 50% by weight.
[*2)]The resin composition produced in Comparative Example 11 is a flame-retardant PC/ABS resin composition, in which a phosphorus-containing flame retardant is used.

INDUSTRIAL APPLICABILITY

The molded article of the present invention, which is produced from a flame retardant aromatic polycarbonate resin composition, has not only a large FL/t ratio (i.e., a very small thickness), wherein FL represents a flow length of the flame retardant aromatic polycarbonate resin composition in a mold used in the production of the molded article and t represents a thickness of the molded article, but also an excellent flame retardancy and an excellent heat resistance. The molded article of the present invention can be advantageously used as housings or parts of various devices, such as computers (e.g., a notebook computer), copying machines, facsimile machines, printers, projectors, portable devices, electric and electronic appliances, and high precision machines. Therefore, the molded article of the present invention is commercially very advantageous.

The invention claimed is:

1. A molded article of a flame-retardant aromatic polycarbonate resin composition, which is produced by injection-molding a molten form of a flame-retardant aromatic polycarbonate resin composition in a mold having at least one gate for introduction of said resin composition, said flame-retardant aromatic polycarbonate resin composition comprising:
   100 parts by weight of an aromatic polycarbonate (A) having a weight average molecular weight of from 17,000 to 35,000,
   0.01 to 3 parts by weight of inorganic compound particles (B) having an average particle diameter of from 10 nm to 10 μm,
   0.001 to 0.5 part by weight of an alkali metal salt (C) of an organic sulfonic acid, and
   0.01 to 0.5 part by weight of a fluoropolymer (D) wherein the largest value of FL/t ratios of the molded article is 50 or more, wherein FL represents a flow length of said resin composition in the mold and t represents a thickness of said molded article,
   said FL/t ratios being obtained by a method comprising:
   measuring the thicknesses of the molded article at portions thereof which, respectively, correspond to flow paths (L) of said molten form of the resin composition in said mold during the injection molding, said flow paths (L) extending from said gate of the mold to points in the mold at which the flow of said molten form of the resin composition stops, and
   calculating an integral of (dL/t') along each of said flow paths (L), wherein dL represents the length of a segment of flow path (L) and t' represents the thickness of the molded article at a portion thereof which corresponds to said segment,
   wherein the integrals respectively calculated with respect to said flow paths (L) are defined as the FL/t ratios of the molded article.

2. The molded article according to claim 1, which has at least one thin portion having a thickness of 2.0 mm or less, wherein the amount of said at least one thin portion is 50% by weight or more, based on the weight of said molded article.

3. The molded article according to claim 1, wherein said inorganic compound particles (B) are metal oxide particles.

4. The molded article according to claim 3, wherein said metal oxide particles are silicon oxide particles produced by the dry method.

5. The molded article according to any one of claims 1 to 4, wherein the surfaces of said inorganic compound particles (B) are modified with a silicon compound.

6. The molded article according to any one of claims 1 to 4, wherein when said alkali metal salt (C) of an organic sulfonic acid is subjected to thermogravimetric analysis at a temperature elevation rate of 10° C./min in a nitrogen atmosphere, the temperature at which the weight reduction of said alkali metal salt (C) reaches 5% by weight is 400° C. or higher.

7. The molded article according to any one of claims 1 to 4, which has at least one functional portion selected from the group consisting of a boss, a rib, a pin and a corner.

8. A method for producing a molded article, which comprises:
- (1) charging a molten form of a flame-retardant aromatic polycarbonate resin composition into a mold by using an injection-molding machine, said flame-retardant aromatic polycarbonate resin composition comprising:
  - 100 parts by weight of an aromatic polycarbonate (A) having a weight average molecular weight of from 17,000 to 35,000,
  - 0.01 to 3 parts by weight of inorganic compound particles (B) having an average particle diameter of from 10 nm to 10 μm,
  - 0.001 to 0.5 part by weight of an alkali metal salt (C) of an organic sulfonic acid, and
  - 0.01 to 0.5 part by weight of a fluoropolymer (D),
  wherein the temperature ($T_M$; °C.) of said molten form of the resin composition charged into the mold satisfies the following formula (1):

$$0.005 Mw + 175 \leq T_M \leq 350 \tag{1}$$

wherein Mw represents the weight average molecular weight of said aromatic polycarbonate (A),

- (2) cooling said resin composition in the mold to thereby form a molded article in the mold, and
- (3) recovering said molded article from the mold.

9. The method according to claim 8, wherein said inorganic compound particles (B) are metal oxide particles.

10. The method according to claim 9, wherein said metal oxide particles are silicon oxide particles produced by the dry method.

11. The method according to any one of claims 8 to 10, wherein the surfaces of said inorganic compound particles (B) are modified with a silicon compound.

12. The method according to any one of claims 8 to 10, wherein when said alkali metal salt (C) of an organic sulfonic acid is subjected to thermogravimetric analysis at a temperature elevation rate of 10° C./min in a nitrogen atmosphere, the temperature at which the weight reduction of said alkali metal salt (C) reaches 5% by weight is 400° C. or higher.

13. The method according to any one of claims 8 to 10, wherein said molded article has at least one functional portion selected from the group consisting of a boss, a rib, a pin and a corner.

* * * * *